(12) United States Patent
Lee et al.

(10) Patent No.: US 7,555,166 B2
(45) Date of Patent: Jun. 30, 2009

(54) PATTERN ANALYSIS-BASED MOTION VECTOR COMPENSATION APPARATUS AND METHOD

(75) Inventors: Sung-hee Lee, Suwon-si (KR); Ohjae Kwon, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 10/887,897

(22) Filed: Jul. 12, 2004

(65) Prior Publication Data

US 2005/0025342 A1 Feb. 3, 2005

(30) Foreign Application Priority Data

Jul. 31, 2003 (KR) .................. 10-2003-0053232

(51) Int. Cl.
*G06K 9/36* (2006.01)
(52) U.S. Cl. ...................... 382/236; 382/232
(58) Field of Classification Search ............... 382/232, 382/233, 236; 375/240
See application file for complete search history.

(56) References Cited

U.S. PATENT DOCUMENTS 5,786,860 A 7/1998 Kim et al.
6,430,317 B1 * 8/2002 Krishnamurthy et al. .... 382/236
7,336,707 B2 * 2/2008 Kim ........................... 375/240

FOREIGN PATENT DOCUMENTS

| JP | 11-075203 A | 3/1999 |
| JP | 11-243551 A | 9/1999 |
| JP | 2000-331169 A | 11/2000 |
| KR | 0174597 B1 | 1/1997 |
| KR | 2003-0029966 A | 4/2003 |

* cited by examiner

*Primary Examiner*—Duy M Dang
(74) *Attorney, Agent, or Firm*—Sughrue Mion, PLLC

(57) ABSTRACT

Disclosed is an apparatus and method for compensating for estimated motion vectors by deciding whether a pattern image exists in target blocks for motion estimation. A motion estimation part compares a current block of a current frame/field to a search area established in a previous frame/field, calculates plural motion estimation error values, and estimates a temporary motion vector of the current block based on the plural motion estimation error values. A pattern decision part analyzes the calculated motion estimation error values, and decides that the current block is a pattern image. A motion compensation part produces a compensation motion vector of the current block by use of the plural motion estimation error values if the current block is decided as the pattern image. A motion vector selection part selects a final motion vector based on a result of the pattern decision part.

39 Claims, 9 Drawing Sheets

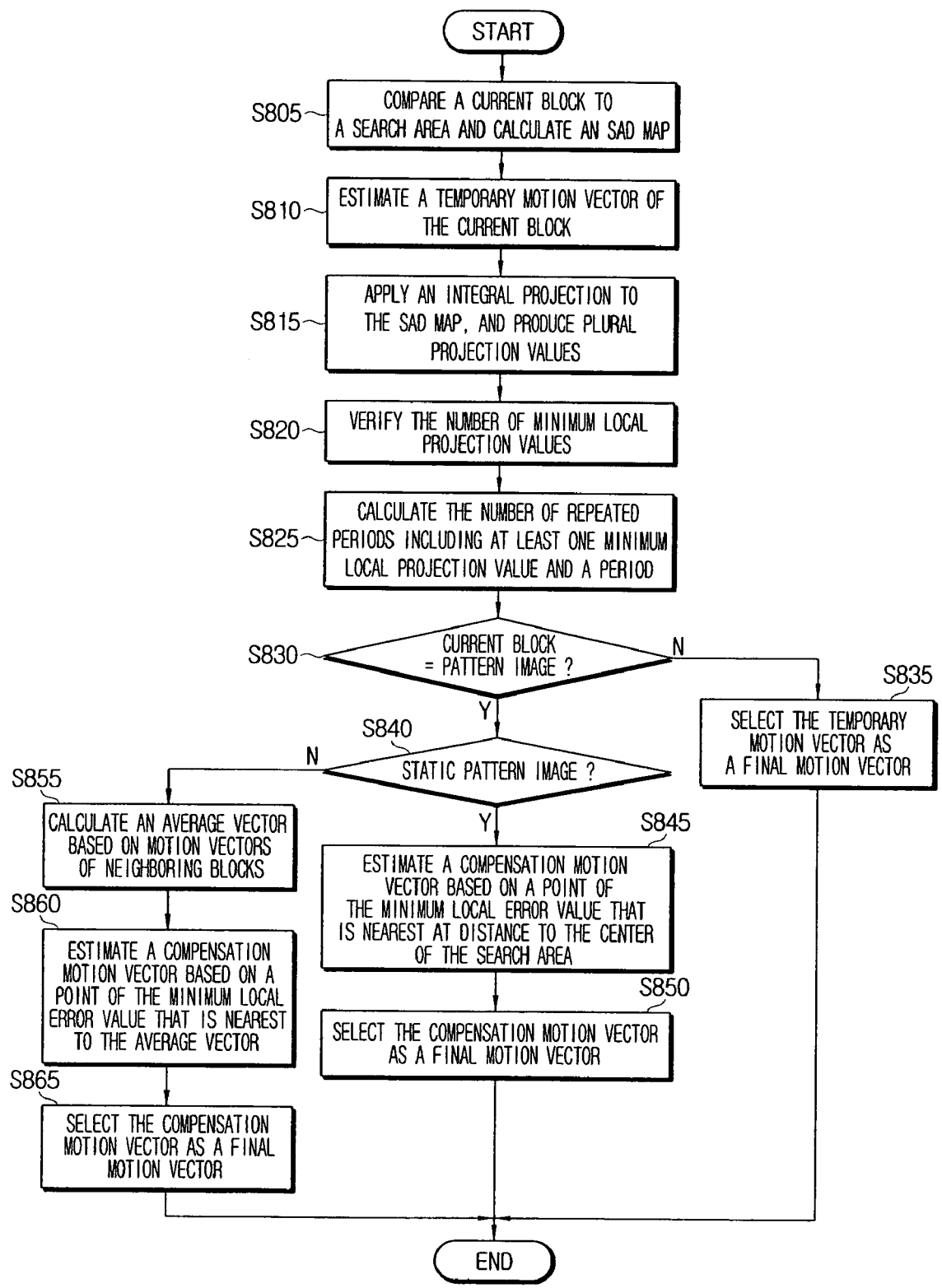

PATTERN ANALYSIS-BASED MOTION VECTOR COMPENSATION APPARATUS AND METHOD

CROSS-REFERENCE TO RELATED APPLICATIONS

This application claims the benefit of Korean Patent Application No. 2003-53232, filed on Jul. 31, 2003, in the Korean Intellectual Property Office, the disclosure of which is incorporated herein by reference.

BACKGROUND OF THE INVENTION

1. Field of the Invention

The present invention relates to a pattern analysis-based motion vector compensation apparatus and method, and more particularly to an apparatus and method for compensating for estimated motion vectors by deciding whether blocks for motion estimation are a pattern image.

2. Description of the Related Art

The motion estimation between image frames is necessarily carried out in image processing such as the frame rate up-conversion (FRC) and the Interlaced-to-progressive conversion (IPC). The motion estimation is used to estimate motion vectors and compensate for motions, and, in general, the block matching algorithm (BMA) is used for the estimation.

The BMA compares two consecutive frames/fields matching one block with another, and estimates one motion vector per block. Here, the motion vector is estimated by use of the known motion estimation error values, for example, the sum of Absolute Difference (SAD) values. Further, the motion compensation process compensates for motions by use of the estimated motion vectors.

However, the conventional motion estimation based on the block-based estimation brings out inaccurate motion vectors from time to time. In particular, precise motion vectors are hardly estimated by use of the BMA only with respect to images of periodic pattern, that is, identical images periodically repeated as shown in FIG. 1A. The periodic pattern is a pattern repeating a certain image in certain intervals, such as stairs, zebra, lattice, and so on.

Thus, when motion compensation is applied to the images of the periodic pattern based on the motion vectors estimated by use of the BMA, the block artifact occurs in the frame/field image compression as shown in FIG. 1B. The block artifact refers to a boundary discontinuity among neighboring blocks, and causes visible and objectionable images together with lower image quality. Such block artifact is caused when the block-based motion compensation is applied by use of estimated motion vectors without considering compensation with neighboring blocks.

SUMMARY OF THE INVENTION

The present invention has been developed in order to solve the above drawbacks and other problems associated with the conventional arrangement. An aspect of the present invention is to provide a pattern analysis-based motion vector compensation apparatus and method capable of compensating for motion vectors in consideration of correlation among blocks by deciding whether a certain pattern image exists in blocks, to thereby reduce block artifact resulting from motion vectors inaccurately estimated on certain blocks.

The forgoing and other objects and advantages are substantially realized by providing a pattern analysis-based motion vector compensation apparatus comprising a motion estimation part for comparing a current block of a current frame/field to a certain search area established in a previous frame/field, calculating plural motion estimation error values, and estimating a temporary motion vector of the current block based on the plural motion estimation error values; a pattern decision part for analyzing the calculated motion estimation error values, and deciding whether the current block is a pattern image; a motion compensation part for producing a compensation motion vector of the current block by use of the plural motion estimation error values if the current block is decided as the pattern image; and a motion vector selection part for selecting as a final motion vector either the temporary motion vector estimated by the motion estimation part or the compensation motion vector compensated for by the motion compensation part based on a result of the pattern decision part.

In detail, the motion estimation part includes a motion estimation error calculation unit for applying a block-matching approach to the current block and search area of the current frame/field divided into blocks in a certain size, and calculating the plural motion estimation error values; and a motion vector estimation unit for estimating the temporary motion vector of the current block based on a point of a minimum motion estimation error value of the plural motion estimation error values produced.

In an exemplary embodiment, the pattern decision part includes an integral projection unit for applying an integral projection to the plural motion estimation error values, and producing plural projection values; a projection value verification unit for verifying the number of at least one minimum local projection values between two points corresponding to predetermined first and second projection values but smaller than the first and second projection values of the plural projection values; a period calculation unit for calculating the number of repeated periods including at least one minimum local projection value sequentially appearing in the plural projection values, and dividing a length of the search area by the number of repeated periods to calculate a period; and a pattern decision unit for analyzing the verified number of minimum local projection values and the calculated number of repeated periods, and deciding whether the current block is the pattern image.

Further, the integral projection unit includes a vertical projector for applying the integral projection to the plural motion estimation error values in a vertical direction, and producing plural vertical projection values; and a horizontal projector for applying the integral projection to the plural motion estimation error values in a horizontal direction, and producing plural horizontal projection values.

Further, the projection value verification unit includes a vertical projection value verification portion for verifying the number of minimum vertical local projection values between two points between predetermined first and second vertical projection values but smaller than the first and second vertical projection values of the plural vertical projection values produced; and a horizontal projection value verification portion for verifying the number of minimum local horizontal projection values between two points corresponding to predetermined first and second horizontal projection values but smaller than the first and second horizontal projection values of the plural horizontal projection values produced.

Further, the period calculation unit includes a vertical period calculator for calculating the number of repeated vertical periods including at least one or more minimum local vertical projection values sequentially appearing in the plural vertical projection values; and a horizontal period calculator for calculating the number of repeated horizontal periods including at least one or more minimum local horizontal projection values sequentially appearing in the plural horizontal projection values.

In an exemplary embodiment, the vertical and horizontal period calculators calculate the numbers of repeated vertical and horizontal periods based on the following equations:

$$\gamma_v = \frac{L_{v,a}}{2L_{v,p}}, \gamma_h = \frac{L_{h,a}}{2L_{h,p}},$$

where, $\gamma_v$ denotes the number of repeated vertical periods, $L_{v,a}$ a vertical projection length obtained from adding all absolute differences between two neighboring vertical projection values of the plural vertical projection values, $L_{v,p}$ an absolute difference between the maximum and minimum vertical projection values of the plural vertical projection values, $\gamma_h$ the number of repeated horizontal periods, $L_{h,a}$ a horizontal projection length obtained from adding all absolute differences between two neighboring horizontal projection values of the plural horizontal projection values, and $L_{h,p}$ an absolute difference between the maximum and minimum horizontal projection values of the plural horizontal projection values.

Further, the vertical period calculator divides a horizontal length of the search area by the number of repeated vertical periods and calculates a vertical period of the pattern image, and the horizontal period calculator divides a vertical length of the search area by the number of repeated horizontal periods and calculates a horizontal period of the pattern image.

In detail, the pattern decision part decides that the current block is a pattern image, if the number of the minimum local projection values is at least two and the number of repeated periods is larger than a predetermined first threshold value.

In another exemplary embodiment, the pattern analysis-based motion vector compensation apparatus further comprises a pattern classification part for classifying the pattern image into a static pattern image having zero motion of the current block or into a dynamic pattern image occurring due to motion of the current block, depending on a point of a minimum local error value that is located at a nearest distance to the center of the search area if the current block is the pattern image.

Further, the pattern classification part compares the minimum local error value located at the nearest distance to the center of the search area to the period calculated by the period calculation part, and classifies the pattern image, the minimum local error value being one of at least one minimum local error values between two points corresponding to predetermined first and second error values but smaller than the first and second error values of the plural motion estimation error values.

Further, the pattern classification part decides that the pattern image is the static pattern image, if the pattern image satisfies a condition as below:

$$|u| = \alpha \cdot p$$

where, u denotes a point of the first minimum local error value that is located at a nearest distance, α denotes a certain constant, and p denotes a period calculated by the period calculation part.

In detail, the motion compensation part includes a static motion compensation unit for estimating and producing the compensation motion vector based on a point corresponding to the first minimum local error value, if the pattern image is classified into the static pattern image; an average vector calculation unit for calculating an average vector of motion vectors of blocks neighboring to the current block, if the pattern image is classified into the dynamic pattern image; and a dynamic motion compensation unit for estimating and producing the compensation motion vector based on a point of a second minimum local error value of at least one or more minimum local error values that is located at a nearest distance to the calculated average vector.

Further, if the pattern decision part decides that the current block is the pattern image, the motion vector selection part selects as the final motion vector the compensation motion vector estimated by the motion compensation part.

Further, if the pattern classification part classifies the pattern image into the static pattern image, the motion vector selection part selects a compensation motion vector estimated by the static motion compensation unit, and, if the pattern classification part classifies the pattern image into the dynamic pattern image, the motion vector selection part selects a compensation motion vector estimated by the dynamic motion compensation unit.

In an exemplary embodiment, first and second motion estimation error values are calculated by use of Sum of Absolute Difference (SAD), Mean Absolute Difference (MAD), or Mean Square Error (MSE).

In the meantime, the forgoing and other objects and advantages are substantially realized by providing a pattern analysis-based motion vector compensation method, comprising a motion estimation step for comparing a current block of a current frame/field to a certain search area established in a previous frame/field, calculating plural motion estimation error values, and estimating a temporary motion vector of the current block based on the plural motion estimation error values; a pattern decision step for analyzing the calculated motion estimation error values, and deciding whether the current block is a pattern image; a motion compensation step for producing a compensation motion vector of the current block by use of the plural motion estimation error values if the current block is decided as the pattern image; and a motion vector selection step for selecting as a final motion vector either the temporary motion vector estimated by the motion estimation step or the compensation motion vector compensated for by the motion compensation step based on a result of the pattern decision step.

In detail, the motion estimation step includes a motion estimation error calculation step for applying a block-matching approach to the current block and search area of the current frame/field divided into blocks in a certain size, and calculating the plural motion estimation error values; and a motion vector estimation step for estimating the temporary motion vector of the current block based on a point of a minimum motion estimation error value of the plural motion estimation error values produced.

Further, the pattern decision step includes an integral projection step for applying an integral projection to the plural motion estimation error values, and producing plural projection values; a projection value verification step for verifying the number of at least one minimum local projection values between two points corresponding to predetermined first and second projection values but smaller than the first and second projection values of the plural projection values; a period calculation step for calculating the number of repeated periods including at least one minimum local projection value sequentially appearing in the plural projection values, and dividing a length of the search area by the number of repeated periods to calculate a period; and a pattern decision step for analyzing the verified number of minimum local projection values and the calculated number of repeated periods, and deciding whether the current block is the pattern image.

Further, the integral projection step includes a vertical projection step for applying the integral projection to the plural motion estimation error values in a vertical direction, and producing plural vertical projection values; and a horizontal projection step for applying the integral projection to the plural motion estimation error values in a horizontal direction, and producing plural horizontal projection values.

Further, the projection value verification step includes a vertical projection value verification step for verifying the number of minimum vertical local projection values between two points corresponding to predetermined first and second vertical projection values but smaller than the first and second vertical projection values of the plural vertical projection values produced; and a horizontal projection value verification step for verifying the number of minimum local horizontal projection values between two points corresponding to predetermined first and second horizontal projection values but smaller than the first and second horizontal projection values of the plural horizontal projection values produced.

Further, the period calculation method includes a vertical period calculation step for calculating the number of repeated vertical periods including at least one or more minimum local vertical projection values sequentially appearing in the plural vertical projection values; and a horizontal period calculation step for calculating the number of repeated horizontal periods including at least one or more minimum local horizontal projection values sequentially appearing in the plural horizontal projection values.

In an exemplary embodiment, the vertical and horizontal period calculation steps calculate the numbers of repeated vertical and horizontal periods based on the following equations:

$$\gamma_v = \frac{L_{v,a}}{2L_{v,p}}, \gamma_h = \frac{L_{h,a}}{2L_{h,p}},$$

where, $\gamma_v$ denotes the number of repeated vertical periods, $L_{v,a}$ denotes a vertical projection length obtained from adding all absolute differences between two neighboring vertical projection values of the plural vertical projection values, $L_{v,p}$ denotes an absolute difference between the maximum and minimum vertical projection values of the plural vertical projection values, $\gamma_h$ denotes the number of repeated horizontal periods, $L_{h,a}$ denotes a horizontal projection length obtained from adding all absolute differences between two neighboring horizontal projection values of the plural horizontal projection values, and $L_{h,p}$ denotes an absolute difference between the maximum and minimum horizontal projection values of the plural horizontal projection values.

Further, the vertical period calculation step divides a horizontal length of the search area by the number of repeated vertical periods and calculates a vertical period of the pattern image, and the horizontal period calculation step divides a vertical length of the search area by the number of repeated horizontal periods and calculates a horizontal period of the pattern image.

The pattern decision step decides that the current block is a pattern image, if the number of the minimum local projection values is at least two and the number of repeated periods is larger than a predetermined first threshold value.

In detail, the pattern analysis-based motion vector compensation method further comprises a pattern classification step for classifying the pattern image into a static pattern image having zero motion of the current block or into a dynamic pattern image occurring due to motion of the current block, depending on a point of a minimum local error value that is located at a nearest distance to the center of the search area if the current block is the pattern image.

Further, the pattern classification step compares a first minimum local error value located at the nearest distance to the center of the search area to the period calculated by the period calculation step, and classifies the pattern image, the first minimum local error value being one of at least one minimum local error values between two points corresponding to predetermined first and second error values but smaller than the first and second error values of the plural motion estimation error values.

The pattern classification step decides that the pattern image is the static pattern image, if the pattern image satisfies a condition as below:

$$|u|=\alpha \cdot p$$

where, u denotes a point of the first minimum local error value that is located at the nearest distance, α denotes a certain constant, and p denotes a period calculated by the period calculation step.

In detail, the motion compensation step includes a static motion compensation step for estimating and producing the compensation motion vector based on a point corresponding to the first minimum local error value, if the pattern image is classified into the static pattern image; an average vector calculation step for calculating an average vector of motion vectors of blocks neighboring to the current block, if the pattern image is classified into the dynamic pattern image; and a dynamic motion compensation step for estimating and producing the compensation motion vector based on a point of a second minimum local error value of at least one minimum local error values that is located at a nearest distance to the calculated average vector.

Further, if the pattern decision step decides that the current block is the pattern image, the motion vector selection step selects as the final motion vector the compensation motion vector estimated by the motion compensation step.

If the pattern classification step classifies the pattern image into the static pattern image, the motion vector selection step selects a compensation motion vector estimated by the static motion compensation step, and, if the pattern classification step classifies the pattern image into the dynamic pattern image, the motion vector selection step selects a compensation motion vector estimated by the dynamic motion compensation step.

BRIEF DESCRIPTION OF THE DRAWINGS

The above aspects and features of the present invention will be more apparent by describing certain embodiments of the present invention with reference to the accompanying drawings, in which:

FIG. 8 is a flow chart for schematically explaining a pattern-based motion vector compensation process of FIG. 2.

DESCRIPTION OF THE ILLUSTRATIVE, NON-LIMITING EMBODIMENTS

Hereinafter, the present invention will be described in detail with respect to the accompanying drawings.

Figure 2:
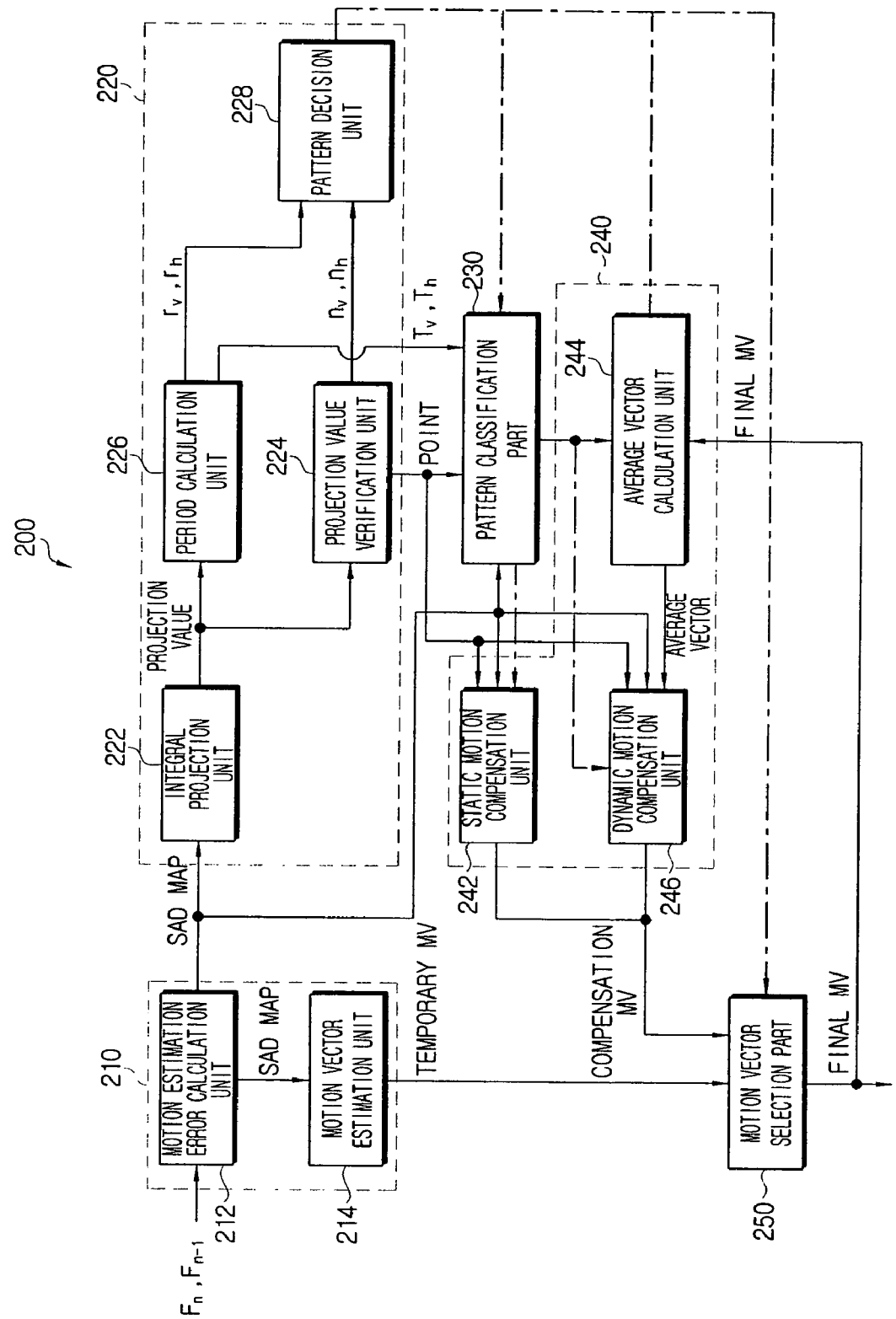
FIG. 2 is a block diagram for schematically showing a pattern-based motion vector compensation apparatus according to a preferred embodiment of the present invention.
Figure 3:
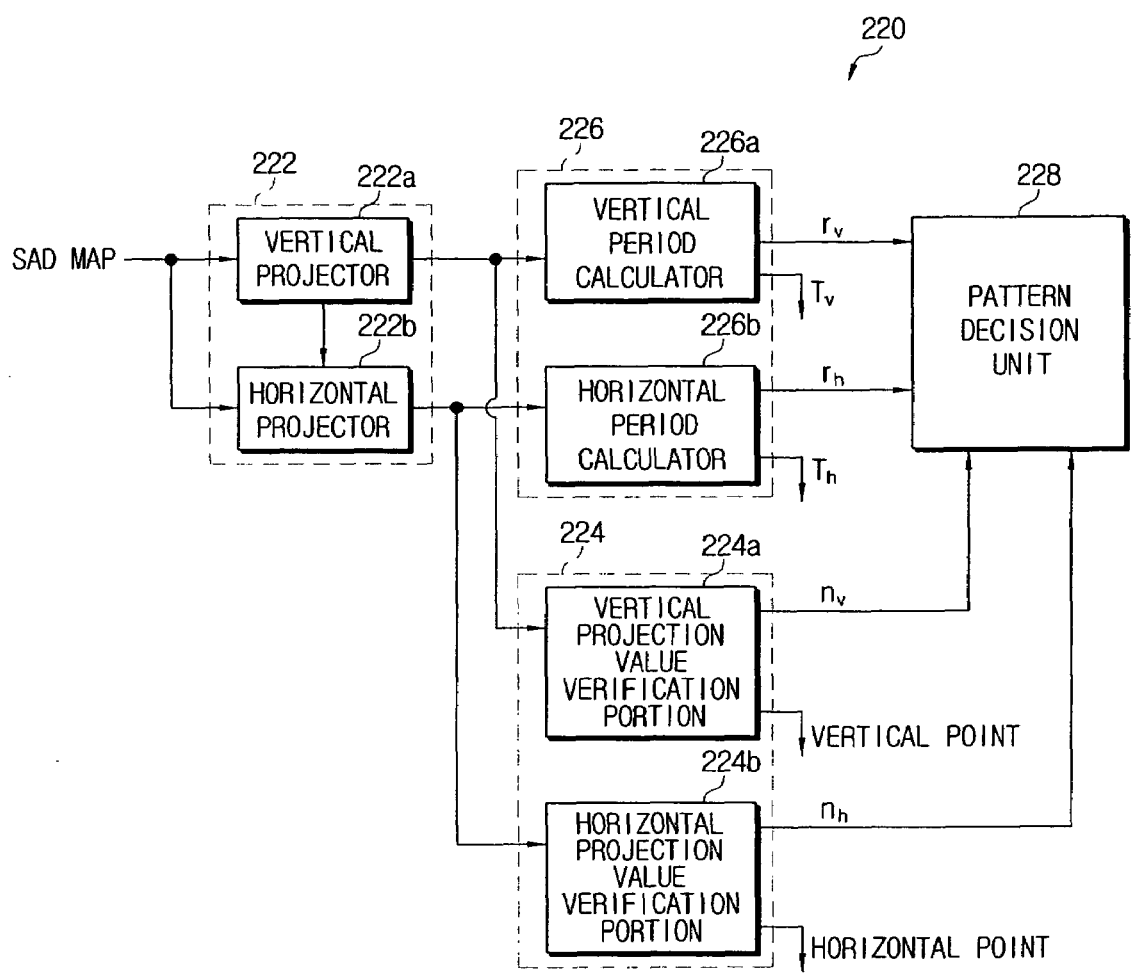
FIG. 3 is a block diagram for showing in detail a pattern decision part shown in FIG. 2.

FIG. 2 is a block diagram for schematically showing a pattern analysis-based motion vector compensation apparatus according to an exemplary embodiment of the present invention, and FIG. 3 is a block diagram for showing in detail a pattern decision part provided in FIG. 2.

Referring to FIG. 2, the pattern analysis-based motion vector compensation apparatus 200 has a motion estimation part 210, a pattern decision part, a pattern classification part 230, a motion compensation part 240, and a motion vector selection part 250.

The motion estimation part 210 includes a motion estimation error calculation unit 212 and a motion vector estimation unit 214.

The motion estimation error calculation unit 212 divides a current input frame/field $f_n$ (hereinafter, referred to as 'current frame') into blocks each having a certain size, and estimates a motion vector v of each block. In more detail, the motion estimation error calculation unit 212 compares the current block for an estimated motion vector, which is one of the divided blocks, to search an area established in a previous frame/field $f_{n-1}$ (hereinafter, referred to as 'previous frame'), so as to calculate plural motion estimation error values.

Here, the plural motion estimation error values can be estimated by bidirectional BMA, unidirectional BMA, or all the known approaches that can estimate motion vectors. Further, the motion estimation error values can be calculated by various approaches such as Sum of Absolute Difference (SAD), Mean Absolute Difference(MAD), Mean Square Error(MSE), and so on, but the present invention applies the SAD values, so the values are referred to as "SAD values".

The motion vector estimation unit 214 estimates a temporary motion vector (temporary MV) of a current block from the minimum error value of the plural motion estimation error values calculated.

In such an approach, the motion estimation part 210 estimates the SAD values and temporary motion vectors of the divided blocks.

Figure 4:
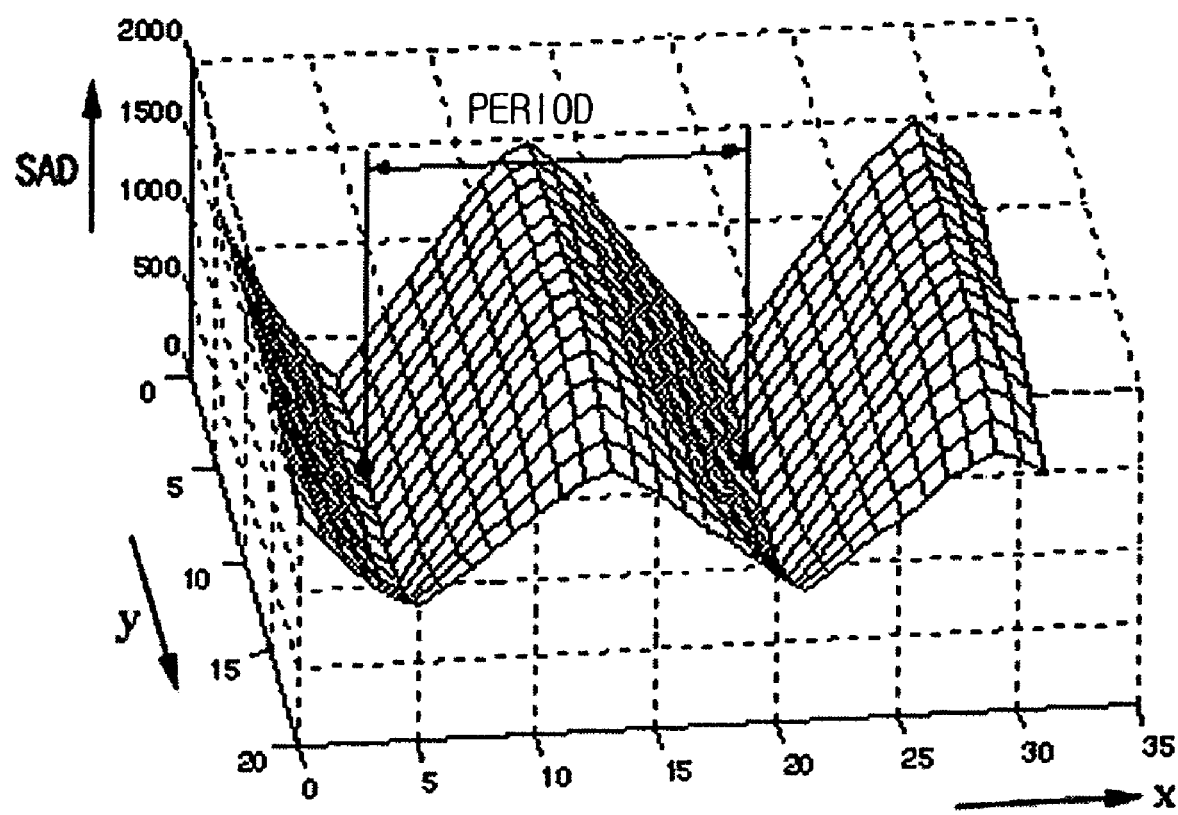
FIG. 4 is a graph for showing in three dimensions a part of a SAD map calculated by a motion estimation error calculation unit shown in FIG. 2.

The calculated SAD values form a SAD map, and the size of the SAD map is identical to the size of search area K×K. FIG. 4 is a graph for showing a part of a calculated SAD map in three dimensions. Referring to FIG. 4, x denotes a horizontal direction axis of a search area, and y a vertical direction axis of the search area. For example, the graph shows that a SAD value at (x,y)=(0,5) is '1500'. Here, the plural SAD values forming the SAD map are obtained by using the BMA as stated above.

The SAD map of a current block of the blocks to which motion compensation is applied is sent to the motion vector estimation unit 214, the pattern decision part 220, the pattern classification part 230, and the motion compensation part 240 that will be later described. Further, the temporary motion vector of the current block is sent to the motion vector selection part 250 to be later described.

The pattern decision part 220 analyzes the calculated SAD map, that is, the plural SAD values forming a search area, and decides whether there exists a pattern image in the current block. The pattern image is an image periodically repeated in certain intervals, which is referred to as a 'periodic pattern image'. Referring to FIG. 3, the pattern decision part 220 includes an integral projection unit 222, a projection value verification unit 224, a period calculation unit 226, and a pattern decision unit 228. Further, the pattern decision part 220 decides a periodic pattern image by considering the vertical and horizontal direction characteristics of the SAD map respectively. Hereinafter, a detailed description will be made on a process of each block to decide the periodic pattern in the horizontal direction, and a description on the decision of the periodic pattern in the vertical direction will be briefly made for the sake of explanation since such a decision is nearly the same as the decision of the periodic pattern in the horizontal direction.

The integral projection unit 222 applies the integral projection to the SAD map of a current block to produce plural integral vectors (hereinafter, referred to as 'projection values'). Accordingly, degradation of image caused by noise can be minimized.

In the present invention, the integral projection unit 222 applies the vertical and horizontal projections, so the integral projection unit 222 has a vertical projector 222a and a horizontal projector 222b.

The vertical projector 222a applies the vertical integral projection to the SAD map of a current block in the vertical direction to produce plural vertical projection values. That is, the vertical projector 222a applies the vertical integral projection in order to decide a periodic pattern in the vertical direction, by which the SAD map of a K×K matrix is converted into a vertical projection value of a K×1 matrix, for example.

Figure 5:
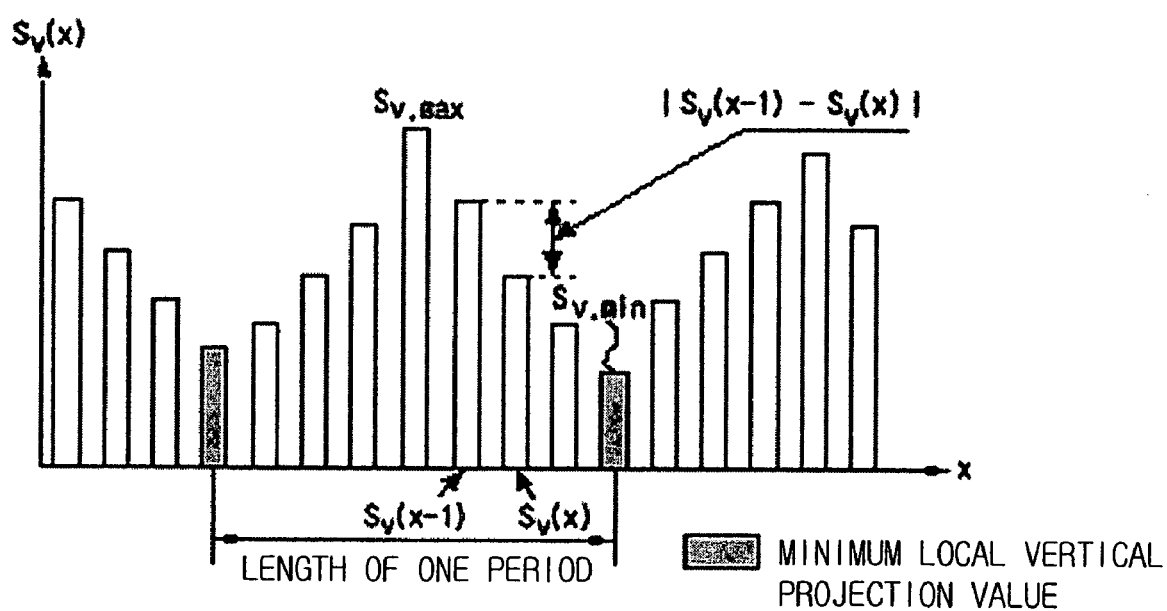
FIG. 5 is a graph for illustrating plural vertical projection values resulting from the certain SAD map shown in FIG. 4.

FIG. 5 is a graph for showing plural vertical projection values produced based on the SAD map as shown in FIG. 4.

An xth vertical projection value produced by the vertical integral projection can be expressed in Equation 1 as below:

$$S_v(x) = \sum_{y=0}^{K-1} E(x, y) \quad \text{[Equation 1]}$$

Referring to FIG. 5 and Equation 1, x denotes a vertical direction axis of a search area, $S_v(x)$ denotes a vertical projection value at the xth point, E(x,y) denotes a SAD value corresponding to a motion vector(x,y), and K denotes the total number of SAD values located on the y axis of the search area.

The horizontal projector 222b applies the integral projection to the SAD map of a current block in the horizontal direction to produce plural horizontal projection values. That is, the horizontal projector 222b applies the horizontal integral projection to decide a periodic pattern in the vertical direction, by which the SAD map of a (K×K) matrix is converted into a horizontal projection value of a (K×1) matrix. The yth horizontal projection value produced by the horizontal integral projection can be expressed in Equation 2 as below:

$$S_h(y) = \sum_{x=0}^{K-1} E(x, y) \quad \text{[Equation 2]}$$

Referring to Equation 2, y denotes a vertical direction axis of a search area, $S_h(y)$ denotes a horizontal projection value at the yth point, E(x,y) denotes a SAD value corresponding to a motion vector(x,y), and K denotes the total number of SAD values located on the x axis of the search area.

The plural vertical and horizontal projection values produced are sent to the projection value verification unit 224.

The projection value verification unit 224 verifies the number of minimum local projection values n of the plural projection values produced by the integral projection unit 222. Here, the minimum local projection values are located between the first and second projection values of the plural projection values, but smaller than the first and second projection values. The verified minimum local projection values are used when the pattern decision part 228 decides whether there exists a pattern image, wherein the pattern decision part 228 will be described later.

In the present invention, the projection value verification unit 224 has a vertical projection value verification portion 224a and a horizontal projection value verification portion 224b.

The vertical projection value verification portion 224a verifies the number of minimum local vertical projection values $n_v$ of the plural vertical projection values produced. The minimum local vertical projection values are located between the first and second vertical projection values of the plural vertical projection values, but smaller than the first and second vertical projection values. Referring to FIG. 5, when a certain vertical projection value $S_v(x)$ is smaller than two neighboring vertical projection values $S_v(x-1)$ and $S_v(x+1)$, the $S_v(x)$ corresponds to the minimum local vertical projection value.

The horizontal projection value verification portion 224b verifies the number of minimum local horizontal projection values $n_h$ of the plural horizontal projection values produced. Here, the minimum local horizontal projection values are located between the first and second horizontal projection values of the plural horizontal projection values, but smaller than the first and second horizontal projection values.

Further, the vertical and horizontal projection verification portions 224a and 224b send the position information of the respective verified minimum local values to the pattern classification part 230, a static motion compensation unit 242, and a dynamic motion compensation unit 246 that will be later described.

The period calculation unit 226 calculates the number of repeated periods γ including at least one of the minimum local projection values that sequentially appear in the plural projection values produced from the integral projection unit 222. Further, the period calculation unit 226 divides the length or size of a search area by the number of repeated periods, and calculates a period T.

In the present invention, the period calculation unit 226 has a vertical period calculator 226a and a horizontal period calculator 226b.

The vertical period calculator 226a calculates the number of repeated vertical periods, using Equation 3. In here, the vertical periods refer to ones including at least one of the minimum local vertical projection values that sequentially appear in the plural vertical projection values produced from the vertical projector 222a.

$$\gamma_v = \frac{L_{v,a}}{2L_{v,p}} = \frac{\sum_{x=0}^{K} |S_v(x-1) - S_v(x)|}{2(S_{v,\max} - S_{v,\min})}, \quad \text{[Equation 3]}$$

where, $\gamma_v$ denotes the number of repeated vertical periods, $L_{v,a}$ denotes a vertical projection length obtained from adding all absolute differences between two neighboring vertical projection values of the plural vertical projection values, and $L_{v,p}$ denotes an absolute difference of the maximum and minimum vertical projection values ($S_{v,max}$, $S_{v,min}$) of the plural vertical projection values. In Equation 3, the absolute difference between the maximum and minimum vertical projection values ($S_{v,max}$, $S_{v,min}$) of the plural vertical projection values refers to a difference between the vertical projection values that corresponds to half a period, so the number of repeated vertical periods can be calculated by using Equation 3. Accordingly, the $2L_{v,p}$ refers to a difference corresponding to one period.

Further, the vertical period calculator 226a calculates a vertical period based on Equation 4 as below:

$$T_v = \frac{K}{\gamma_v}, \quad \text{[Equation 4]}$$

where, $T_v$ denotes a vertical period, K denotes a horizontal direction length of a search area, and $\gamma_v$ denotes the number of repeated vertical periods. Referring to Equation 4, the vertical period calculator 226a divides the horizontal direction length of a search area by the number of repeated vertical periods, and then calculates a vertical period.

On the other hand, the horizontal period calculator 226b calculates the number of repeated horizontal periods based on Equation 5. Here, the horizontal periods refer to ones including at least one of the minimum local horizontal projection values that sequentially appear in the plural horizontal projection values produced from the horizontal projector 222b.

$$\gamma_h = \frac{L_{h,a}}{2L_{h,p}} = \frac{\sum_{y=0}^{K} |S_h(y-1) - S_h(y)|}{2(S_{h,\max} - S_{h,\min})}, \quad \text{[Equation 5]}$$

where, $\gamma_h$ denotes the number of repeated vertical periods, $L_{h,a}$ denotes a horizontal projection length obtained from adding all absolute differences between two neighboring horizontal projection values of the plural horizontal projection values, and $L_{h,p}$ denotes an absolute difference between the maximum and minimum horizontal projection values($S_{h,max}$, $S_{h,min}$) of the plural horizontal projection values. Referring to Equation 5, the difference between the maximum and minimum horizontal projection values of the horizontal projection values refers to a difference between the horizontal projection values corresponding to half a period, so the number of repeated horizontal periods can be calculated by use of Equation 5. Thus, the $2L_{h,p}$ refers to a difference corresponding to one period.

Further, the horizontal period calculator 226b calculates a horizontal period using Equation 6 as below:

$$T_h = \frac{K}{\gamma_h},\qquad\text{[Equation 6]}$$

where, $T_h$ denotes a horizontal period, K denotes a vertical direction length of a search area, and $\gamma_h$ denotes the number of repeated horizontal periods. Referring to Equation 6, the horizontal period calculator 226b divides the vertical direction length of a search area by the number of repeated horizontal periods, and then calculates a horizontal period.

The pattern decision unit 228 analyzes the number of the minimum local projection values n verified by the projection value verification unit 224 and the number of repeated periods γ calculated from the period calculation unit 226, and decides whether there exists a pattern image in a current block. In more detail, the pattern decision unit 228 decides the current block as a periodic pattern image if there exist at least two minimum local projection values and the number of repeated periods is larger than a predetermined first threshold value.

For example, when deciding a periodic pattern in the vertical direction, the pattern decision unit 228 decides that the current block is a periodic pattern image in the vertical direction if there exist at least two minimum local vertical projection values verified by the vertical projection value verification portion 224a and the vertical period calculated by the vertical period calculator 226a is larger than the first threshold value of 1.75. Further, as for the decision on a periodic pattern in the vertical direction, the established first threshold value can be identical to or different from the value of 1.75.

Further, the pattern decision unit 228 sends the decided result to the pattern classification part 230, motion compensation part 240, and motion vector selection part 250 that will be later described.

If the pattern decision unit 228 decides the current block as a pattern image, the pattern classification part 230 classifies the pattern image into any of a static pattern image and a dynamic pattern image based on where the minimum local error value exists that is nearest to the center of a search area (that is, a zero vector), which means there is no motion. Here, the static pattern image refers to a periodic pattern image having no substantial motion (that is, a zero vector) of the current block, and the dynamic pattern image refers to a periodic pattern image having substantial motion of the current block.

In more detail, the pattern classification part 230 compares the minimum local error value, which is a value of at least one minimum local error value located at a nearest distance to the center of the search area, with a period of the periodic pattern image calculated by the period calculation unit 226, and classifies a pattern image into one in the vertical direction or one in the horizontal direction. The minimum local error value refers to a value of the SAD map that is between predetermined first and second error values, but smaller than the first and second error values.

For example, the pattern classification part 230 classifies the periodic pattern images in horizontal direction, using Equation 7 as below:

periodic pattern image in horizontal direction=static pattern image, if $|x'|<\alpha T_v$, or, dynamic pattern image, otherwise  [Equation 7]

where, x' denotes a location of the minimum local error value nearest at distance to the center of a search area, $T_v$ denotes a vertical period, and α denotes a certain constant of ⅛ in the present invention but not limited to the constant.

Figure 6A:
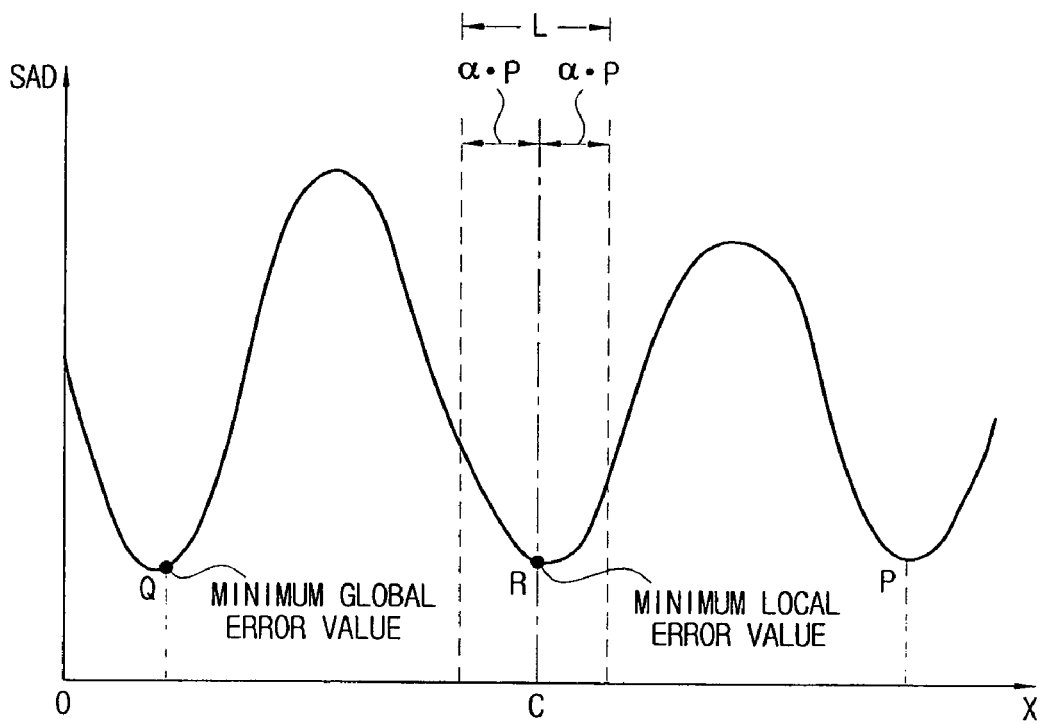
FIG. 6A and FIG. 6B are views for showing a two-dimensional SAD map resulting from an image with a static pattern and a two-dimensional SAD map resulting from an image with a dynamic pattern, respectively.
Figure 6B:
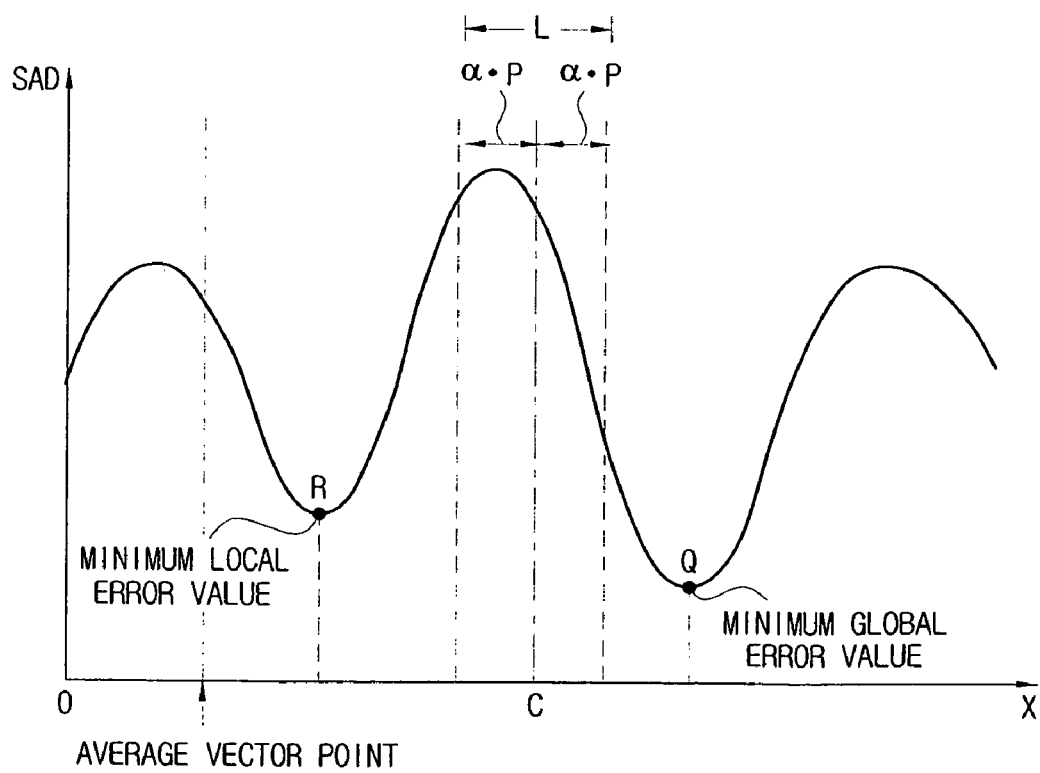

FIG. 6A is a graph for explaining a SAD map of a static pattern image, and FIG. 6B is a graph for explaining a SAD map of a dynamic pattern image, which are two-dimensional graphs of the center region of the search area of the SAD map of FIG. 4.

First, referring to Equation 7 and FIG. 6A, points P and R each denote the minimum local error values, a point C denotes the center of a search area indicating a location at which there exists no motion of a current block, and L denotes a range moving by α in the left and by $T_v$ in the right from the center of the search area C, the range being established in advance for pattern image classification. In such an occasion, the pattern classification part 230 classifies into a static pattern image a periodic pattern image in the vertical direction that the pattern decision part 220 has decided, if the point R, that is, the minimum local error value nearest to the center C of the search area is included in the range L. Here, the minimum global error value refers to the minimum motion estimation error value of the plural motion estimation error values forming the SAD map.

On the other hand, referring to Equation 7 and FIG. 6B, the pattern classification part 230 classifies into a dynamic pattern image the periodic pattern image in the horizontal direction that the pattern decision part 220 has decided, if the point R, that is, the minimum local error value nearest to the center of the search area is not included in the established range L.

Further, the pattern classification part 230 classifies periodic pattern images in the vertical direction based on Equation 8.

periodic pattern image in vertical direction=static pattern image, if $|y'|<\alpha T_h$, or, dynamic pattern image, otherwise  [Equation 8]

Referring to Equation 8, y' denotes a point of the minimum local error value that is nearest at distance to the center of a search area, $T_h$ denotes a horizontal period, and α denotes a predetermined constant for which the present invention uses ⅛, but the constant is not limited to that value of ⅛. The classification into pattern images in the horizontal direction is carried out in a way similar to that into pattern images in the vertical direction, so explanation on such a classification will be omitted.

The motion compensation part 240 uses the SAD map to produce a compensation motion vector of a current block, if the current block is decided to be a pattern image. In particular, the motion compensation part 240 produces a motion vector adaptively compensated depending on pattern images in the vertical and horizontal directions decided by the pattern decision part 220. The point of the minimum local error value of a periodic pattern moves with the motion of the periodic pattern, so the motion compensation part 240 carries out compensation, considering the motion of the periodic pattern. That is, the motion compensation part 240 adaptively carries out motion compensation according to a classification result done by the pattern classification part 230. To do this, the motion compensation part 240 has a static motion compensation unit 242, an average vector calculation unit 244, and a dynamic motion compensation unit 246.

The static motion compensation unit 242 produces the compensation motion vector of a current block decided as a static pattern image by the pattern classification part 230. In more detail, the static motion compensation unit 242 produces compensation motion vectors from the point of the minimum local error value, for example, the point R of FIG. 6A, that is located at a nearest distance to the center of a search area. Thus, it is prevented that the vectors corresponding to the other minimum local error values, for example, the points P and Q of FIG. 6A are decided as a final motion vector of the current block. The compensation process in the static motion compensation unit 242 decides consistent motion vectors from plural blocks forming one periodic pattern. Thus, estimated vectors are used in compensating for images, so the mismatching of patterns between blocks, that is, the block artifact phenomenon occurring in a periodic pattern image can be greatly reduced.

Further, if the pattern classification part 230 decides the pattern image of a current block as a dynamic pattern image, the average vector calculation unit 244 calculates an average vector of motion vectors of the blocks neighboring to the current block prior to producing a compensation motion vector. Here, the motion vectors of the respective neighboring blocks are final motion vectors provided by the motion vector selection part 250 which will be later described.

The dynamic motion compensation unit 246 approximately estimates the motion vector of the current block based on the average vector of the motion vectors of the neighboring blocks as described above, which will be described in detail with reference to FIG. 6B. That is, the dynamic motion compensation unit 246 produces a compensation motion vector based on the point R of the minimum local error value that is located at a nearest distance to a calculated average vector of at least one minimum local error value. However, since it is uncertain that any of the plural minimum local error values indicates a substantial motion in case that the pattern image of a current block is a dynamic pattern image, correlation among motion vectors of neighboring blocks is used to produce a compensated motion vector (MV) of the current block.

The motion vector selection part 250 selects as a final motion vector (final MV) one of a temporary motion vector estimated by the motion estimation part 210 and a compensation motion vector compensated by the motion compensation part 240 based on a decision result of the pattern decision unit 228. In more detail, if the pattern decision unit 228 decides that the current block is not a pattern image, the motion vector selection part 250 selects as a final motion vector the temporary motion vector estimated by the motion estimation part 210.

On the other hand, if the pattern decision unit 228 decides the current block as the pattern image, the motion vector selection part 250 selects as a final motion vector the compensation motion vector produced by any of the static and dynamic motion compensation units 242 and 246. That is, if the pattern decision unit 228 decides the current block as a pattern image and the pattern classification part 230 classifies the pattern image into a static pattern image, the motion vector selection part 250 selects as a final motion vector a compensation motion vector produced from the static motion compensation unit 242. Further, if the pattern decision unit 228 decides the current block as a pattern image and the pattern classification part 230 classifies the pattern image as a dynamic pattern image, the motion vector selection part 250 selects as the final motion vector the compensation motion vector produced from the dynamic motion compensation unit 246.

Figure 1A:
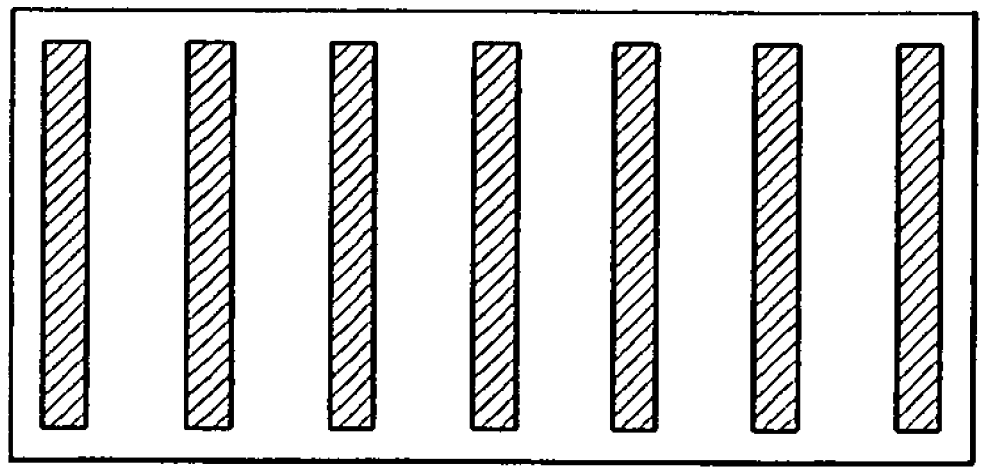
FIG. 1A is a view for showing an image of periodic pattern in general.
Figure 1B:
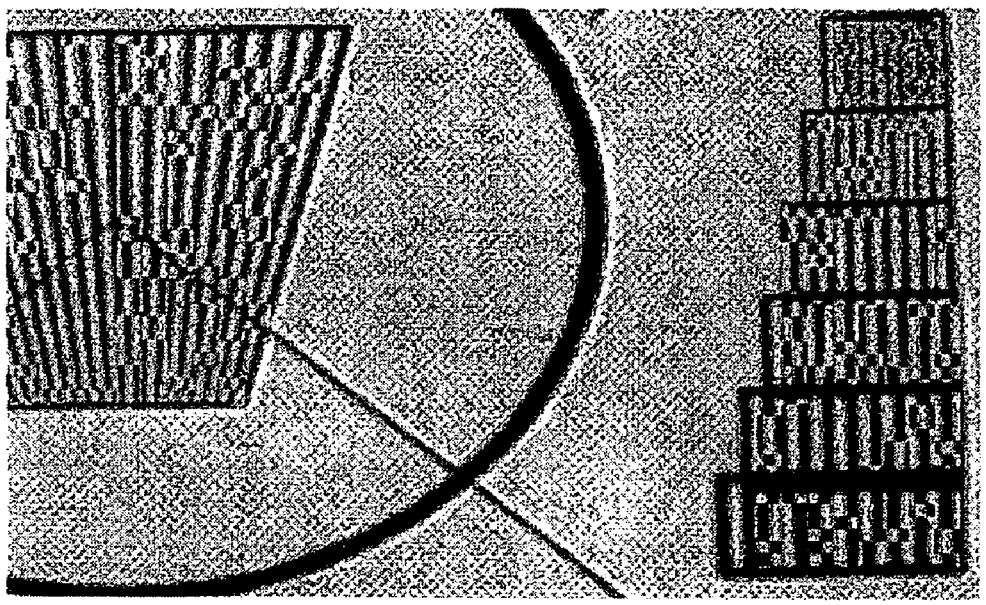
FIG. 1B is a view for showing a simulation of an image of periodic pattern with block artifact by use of a conventional motion estimation method.
Figure 7:
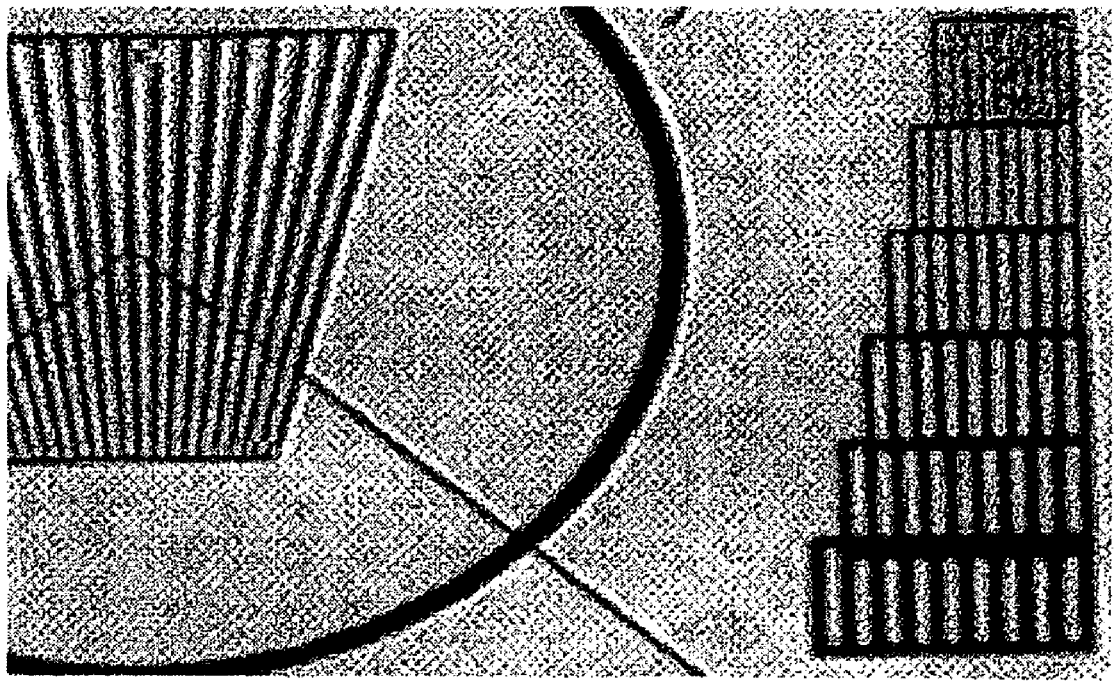
FIG. 7 is a view for simulating an image with reduced block artifact by the pattern decision part of FIG. 2.

As stated above, by deciding whether a current block is a pattern image and then deciding a final motion vector, images can be obtained at image output terminals(not shown) of which block artifact has been remarkably reduced as shown in FIG. 7, compared to FIG. 1A.

FIG. 8 is a flow chart for schematically explaining a motion vector compensation process based on the pattern of FIG. 2.

Referring to FIG. 2 to FIG. 8, first, the motion estimation error calculation unit 212 compares a current block to a search area established on a previous frame, and calculates plural motion estimation error values (S805). Any of the SAD, MAD, and MSE values can be applied for the plural motion estimation error values, and the present invention applies the SAD values therefor. Accordingly, hereinafter, the plural motion estimation error values calculated are referred to as a SAD map. The motion vector estimation unit 214 estimates a temporary motion vector of the current block based on a point having the minimum SAD value in the SAD map (S810).

If the SAD map is calculated, the integral projection unit 222 applies an integral projection to the SAD map, and produces plural projection values (S815). The projection value verification unit 224 verifies the number of minimum local projection values of the plural projection values produced in step S815 (S820). Further, the period calculation unit 226 calculates the number of repeated periods including at least one of the minimum local projection values sequentially appearing in the plural projection values, and divides a length of the search area by the number of repeated periods to calculate an actual period (S825).

If step S825 is carried out, the pattern decision unit 228 analyzes the number of the minimum local projection values verified in step S820 and the number of repeated periods calculated in step S825, and decides whether the current block is a pattern image (S830). If step S830 decides that the current block is not the pattern image, the motion vector selection part 250 selects the temporary motion vector estimated in step S810 as a final motion vector of the current block (S835).

On the other hand, if step S830 decides that the current block is the pattern image, the pattern classification part 230 classifies the pattern image into a static pattern image or a dynamic pattern image (S840).

If step S840 classifies the pattern image into the static pattern image, the static motion compensation unit 242 estimates the compensation motion vector based on the point of a minimum local error value that is located at a nearest distance to the center of the search area (S845). Further, the motion vector selection part 250 selects the compensation motion vector estimated in step S845 as the final motion vector of the current block (S850).

On the other hand, if step S840 decides that the pattern image is the dynamic pattern image, the average vector calculation unit 244 calculates an average vector of the motion vectors of the blocks neighboring to the current block (S855). If step S855 is carried out, the dynamic motion compensation unit 246 estimates a compensation motion vector based on the point of the minimum local error value of the SAD map that is nearest to the average vector calculated in step S855 (S860). Further, the motion vector selection part 250 selects the compensation motion vector estimated in step S860 as the final motion vector of the current block (S850).

In the meantime, in the present invention as described above, if the pattern decision unit 228 decides that the current block is the pattern image, the pattern classification part 230, static motion compensation part 242, and dynamic motion compensation part 246 read information of the points of the minimum local error values respectively verified by the vertical projection value verification portion 224a and the horizontal projection value verification portion 224b, and carry out their own operations.

If the pattern decision unit 228 decides that the current block is the pattern image, the pattern classification part 230, static motion compensation unit 242, and dynamic motion compensation unit 246 extract information of the points of the minimum local projection values respectively verified by the vertical projection value verification portion 224a and the horizontal projection value verification portion 224b, and carry out their own operations.

A description will be made as below on the extraction of the information of the points of the minimum local projection values and the respective operations with reference to FIG. 2.

The motion estimation part 210 estimates SAD values and temporary motion vectors of the blocks equally divided as above. Further, the motion estimation part 210 sends the SAD map consisting of the SAD values to the pattern decision part 220 and the pattern classification part 230.

The pattern decision part 220 analyzes the SAD map that has been sent, and decides whether the current block is a pattern image. To do this, the integral projection unit 222 of the pattern decision part 220 applies the integral projection to the SAD map of the current block, and produces plural integral vectors. Preferably, the integral projection unit 222 applies the vertical integral projection and the horizontal integral projection to respectively produce plural vertical integral vectors and horizontal integral vectors. Hereinafter, the vertical integral vector is referred to as a 'vertical projection value', and the horizontal integral vector is referred to as a 'horizontal projection value'.

Further, the projection value verification unit 224 verifies the number of minimum local vertical projection values of the plural vertical projection values produced, $n_v$, and the number of minimum local horizontal projection values of the horizontal projection values produced, $n_h$. Further, the projection value verification unit 224 verifies information of the points of the plural minimum local vertical and horizontal projection values, and send the information to the pattern classification part 230, static motion compensation unit 242, and dynamic motion compensation unit 246.

If the pattern decision unit 228 decides that the current block is the pattern image, the pattern classification part 230 classifies a pattern image into a static pattern image or a dynamic pattern image based on the point of the minimum local projection value that is nearest to the center of the search area and indicates that there exists no motion.

In more detail, the pattern classification part 230 compares the minimum local projection value of at least one or more minimum local projection values at a point located at a nearest distance to the center of the search area to a period of the periodic pattern image calculated by the period calculation unit 226, and classifies the pattern image into one in the vertical direction or one in the horizontal direction. The minimum local projection value refers to a value smaller than the SAD projection values corresponding to predetermined first and second projection values of the SAD projection values.

The description will be omitted on the pattern image classified by the pattern classification part 230 since the above description with reference to FIG. 6A and FIG. 6B can be similarly applied. However, FIG. 6A and FIG. 6B show the classification of the pattern image of the current block, establishing the minimum global error value as the minimum global projection value and the minimum local error value as the minimum local projection value.

The motion compensation part 240 carries out motion compensation based on a result of the pattern classification part 230. In particular, if the current block is a pattern image, the motion compensation part 240 uses information of the points of the plural integral vectors, that is, integral projection values verified by the projection value verification unit 224, and produces a compensation motion vector of the current block.

In more detail, the static motion compensation unit 242 uses information of the points of the plural integral projection values, and produces a compensation motion vector of the current block decided as the static pattern image, whereas the dynamic motion compensation unit 246 uses the information of the points of the plural integral projection values and an average vector calculated by the average vector calculation unit 244, and produces a compensation motion vector of the current block decided as the dynamic pattern image.

The motion vector selection part 250 selects as a final motion vector(final MV) either a temporary motion vector estimated by the motion estimation part 210 or a compensation motion vector compensated for by the motion compensation part 240 based on a decision result of the pattern decision unit 228.

That is, if the pattern decision unit 228 decides that the current block is not a pattern image, the motion vector selection part 250 selects as the final motion vector the temporary motion vector estimated by the motion estimation part 210.

On the other hand, if the pattern decision unit 228 decides that the current block is the pattern image, the motion vector selection part 250 selects as the final motion vector a compensation motion vector produced by either the static motion compensation unit 242 or the dynamic motion compensation unit 246.

Further, the vertical and horizontal period calculators 226a and 226b of the present invention calculate vertical and horizontal periods regardless of a decision result of the pattern decision unit 228, but can be adapted to calculate the vertical and horizontal periods only if the pattern decision unit 228 decides that the current block is a pattern image.

As described so far, the pattern analysis-based motion vector compensation apparatus and method according to the present invention can analyze, based on motion estimation error values, a pattern of a pattern area at which a precise motion vector is hardly estimated, and estimate precise motion vectors by use of correlation among neighboring blocks. Therefore, when applied to the FRC, IPC, and so on, the present invention can effectively reduce the image quality degradation phenomenon such as block artifact occurring in the compensation images due to motion vector estimation errors.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A pattern analysis-based motion vector compensation apparatus, comprising:
a motion estimation part for comparing a current block of a current frame/field with a certain search area established in a previous frame/field, calculating plural motion estimation error values based on the comparison, and estimating a temporary motion vector of the current block based on the plural motion estimation error values;
a pattern decision part for analyzing the calculated motion estimation error values, and deciding whether the current block is a pattern image based on the analyzed motion estimation error values;

a motion compensation part for producing a compensation motion vector of the current block by use of the plural motion estimation error values if the current block is decided as the pattern image; and a motion vector selection part for selecting as a final motion vector either the temporary motion vector estimated by the motion estimation part or the compensation motion vector compensated for by the motion compensation part based on a result of the pattern decision part.

2. The pattern analysis-based motion vector compensation apparatus as claimed in claim 1, wherein the motion estimation part includes:

a motion estimation error calculation unit for applying a block-matching approach to the current block and the search area of the current frame/field, and calculating the plural motion estimation error values based on the applied block-matching approach; and a motion vector estimation unit for estimating the temporary motion vector of the current block based on a point of a minimum motion estimation error value of the plural motion estimation error values produced.

3. The pattern analysis-based motion vector compensation apparatus as claimed in claim 1, wherein the pattern decision part includes:

an integral projection unit for applying an integral projection to the plural motion estimation error values, and producing plural projection values;

a projection value verification unit for verifying the number of minimum local projection values between two points corresponding to predetermined first and second projection values but smaller than the first and second projection values of the plural projection values;

a period calculation unit for calculating the number of repeated periods including the at least one minimum local projection value sequentially appearing in the plural projection values, and dividing a length of the search area by the number of repeated periods to calculate the period; and a pattern decision unit for analyzing the verified number of minimum local projection values and the calculated number of repeated periods, and deciding whether the current block is the pattern image.

4. The pattern analysis-based motion vector compensation apparatus as claimed in claim 3, wherein the integral projection unit includes:

a vertical projector for applying the integral projection to the plural motion estimation error values in a vertical direction, and producing plural vertical projection values; and a horizontal projector for applying the integral projection to the plural motion estimation error values in a horizontal direction, and producing plural horizontal projection values.

5. The pattern analysis-based motion vector compensation apparatus as claimed in claim 4, wherein the projection value verification unit includes:

a vertical projection value verification portion for verifying the number of minimum vertical local projection values between two points corresponding to predetermined first and second vertical projection values but smaller than the first and second vertical projection values of the plural vertical projection values produced; and a horizontal projection value verification portion for verifying the number of minimum local horizontal projection values between two points corresponding to predetermined first and second horizontal projection values but smaller than the first and second horizontal projection values of the plural horizontal projection values produced.

6. The pattern analysis-based motion vector compensation apparatus as claimed in claim 5, wherein the period calculation unit includes:

a vertical period calculator for calculating the number of repeated vertical periods including at least one or more minimum local vertical projection values sequentially appearing in the plural vertical projection values; and a horizontal period calculator for calculating the number of repeated horizontal periods including at least one or more minimum local horizontal projection values sequentially appearing in the plural horizontal projection values.

7. The pattern analysis-based motion vector compensation apparatus as claimed in claim 6, wherein the vertical and horizontal period calculators calculate the numbers of repeated vertical and horizontal periods based on Equation as below:

$$\gamma_v = \frac{L_{v,a}}{2L_{v,p}}, \gamma_h = \frac{L_{h,a}}{2L_{h,p}},$$

wherein, $\gamma_v$ denotes the number of repeated vertical periods, $L_{v,a}$ denotes a vertical projection length obtained from adding all absolute differences between two neighboring vertical projection values of the plural vertical projection values, $L_{v,p}$ denotes an absolute difference between the maximum and minimum vertical projection values of the plural vertical projection values, $\gamma_h$ denotes the number of repeated horizontal periods, $L_{h,a}$ denotes a horizontal projection length obtained from adding all absolute differences between two neighboring horizontal projection values of the plural horizontal projection values, and $L_{h,p}$ denotes an absolute difference between the maximum and minimum horizontal projection values of the plural horizontal projection values.

8. The pattern analysis-based motion vector compensation apparatus as claimed in claim 6, wherein the vertical period calculator divides a horizontal length of the search area by the number of repeated vertical periods and calculates a vertical period of the pattern image, and the horizontal period calculator divides a vertical length of the search area by the number of repeated horizontal periods and calculate a horizontal period of the pattern image.

9. The pattern analysis-based motion vector compensation apparatus as claimed in claim 3, wherein the pattern decision part decides that the current block is a pattern image, if the number of the minimum local projection values is at least two and the number of repeated periods is larger than a predetermined first threshold value.

10. The pattern analysis-based motion vector compensation apparatus as claimed in claim 3, further comprising a pattern classification part for classifying the pattern image into a static pattern image having zero motion of the current block or into a dynamic pattern image occurring due to motion of the current block, depending on a point of a minimum local error value that is nearest at distance to the center of the search area if the current block is the pattern image.

11. The pattern analysis-based motion vector compensation apparatus as claimed in claim 10, wherein the pattern classification part compares a first minimum local error value located nearest at distance to the center of the search area with the period calculated by the period calculation part, and classifies the pattern image, the first minimum local error value being one of at least one minimum local error values between two points corresponding to predetermined first and second error values but smaller than the first and second error values of the plural motion estimation error values.

12. The pattern analysis-based motion vector compensation apparatus as claimed in claim 11, wherein the pattern classification part decides that the pattern image is the static pattern image, if the pattern image satisfies a condition as below:

$$|u| \alpha \cdot p$$

wherein, u denotes a point of the first minimum local error value that is nearest at distance, α denotes a certain constant, and p denotes a period calculated by the period calculation part.

13. The pattern analysis-based motion vector compensation apparatus as claimed in claim 11, wherein the motion compensation part includes:
 a static motion compensation unit for estimating and producing the compensation motion vector based on a point corresponding to the first minimum local error value, if the pattern image is classified into the static pattern image;
 an average vector calculation unit for calculating an average vector of motion vectors of blocks neighboring to the current block, if the pattern image is classified into the dynamic pattern image; and
 a dynamic motion compensation unit for estimating and producing the compensation motion vector based on a point of a second minimum local error value of at least one or more minimum local error values that is located nearest at distance to the calculated average vector.

14. The pattern analysis-based motion vector compensation apparatus as claimed in claim 13, wherein, if the pattern classification part classifies the pattern image into the static pattern image, the motion vector selection part selects a compensation motion vector estimated by the static motion compensation unit, and, if the pattern classification part classifies the pattern image into the dynamic pattern image, the motion vector selection part selects a compensation motion vector estimated by the dynamic motion compensation unit.

15. The pattern analysis-based motion vector compensation apparatus as claimed in claim 1, wherein, if the pattern decision part decides that the current block is the pattern image, the motion vector selection part selects as the final motion vector the compensation motion vector estimated by the motion compensation part.

16. The pattern analysis-based motion vector compensation apparatus as claimed in claim 1, wherein the plural motion estimation error values are calculated by use of Sum of Absolute Difference (SAD), Mean Absolute Difference (MAD), or Mean Square Error (MSE).

17. The pattern analysis-based motion vector compensation apparatus as claimed in claim 1, wherein the motion compensation part calculates the compensated motion vector separately from and independently of the calculation of the temporary motion vector estimated by the motion estimation part.

18. A pattern analysis-based motion vector compensation method, comprising:
 using a processor to perform:
 a motion estimation step for comparing a current block of a current frame/field to a certain search area established in a previous frame/field, calculating plural motion estimation error values based on the comparison, and estimating a temporary motion vector of the current block based on the plural motion estimation error values;
 a pattern decision step for analyzing the calculated motion estimation error values, and deciding whether the current block is a pattern image based on the analyzed motion estimation error values;
 a motion compensation step for producing a compensation motion vector of the current block by use of the plural motion estimation error values if the current block is decided as the pattern image; and
 a motion vector selection step for selecting as a final motion vector either the temporary motion vector estimated by the motion estimation step or the compensation motion vector compensated for by the motion compensation step based on a result of the pattern decision step.

19. The pattern analysis-based motion vector compensation method as claimed in claim 18, wherein the motion estimation step includes:
 a motion estimation error calculation step for applying a block-matching approach to the current block and the search area of the current frame/field, and calculating the plural motion estimation error values based on the applied block-matching approach; and
 a motion vector estimation step for estimating the temporary motion vector of the current block based on a point of a minimum motion estimation error value of the plural motion estimation error values produced.

20. The pattern analysis-based motion vector compensation method as claimed in claim 18, wherein the pattern decision step includes:
 an integral projection step for applying an integral projection to the plural motion estimation error values, and producing plural projection values;
 a projection value verification step for verifying the number of minimum local projection values between two points corresponding to predetermined first and second projection values but smaller than the first and second projection values of the plural projection values;
 a period calculation step for calculating the number of repeated periods including the at least one minimum local projection value sequentially appearing in the plural projection values, and dividing a length of the search area by the number of repeated periods to calculate the period; and
 a pattern decision step for analyzing the verified number of minimum local projection values and the calculated number of repeated periods, and deciding whether the current block is the pattern image.

21. The pattern analysis-based motion vector compensation method as claimed in claim 20, wherein the integral projection step includes:
 a vertical projection step for applying the integral projection to the plural motion estimation error values in a vertical direction, and producing plural vertical projection values; and
 a horizontal projection step for applying the integral projection to the plural motion estimation error values in a horizontal direction, and producing plural horizontal projection values.

22. The pattern analysis-based motion vector compensation method as claimed in claim 21, wherein the projection value verification step includes:
 a vertical projection value verification step for verifying the number of minimum vertical local projection values between two points corresponding to predetermined first and second vertical projection values but smaller than the first and second vertical projection values of the plural vertical projection values produced; and a horizontal projection value verification step for verifying the number of minimum local horizontal projection values between the two points corresponding to predetermined first and second horizontal projection values but smaller than the first and second horizontal projection values of the plural horizontal projection values produced.

23. The pattern analysis-based motion vector compensation method as claimed in claim 22, wherein the period calculation method includes:

a vertical period calculation step for calculating the number of repeated vertical periods including at least one or more minimum local vertical projection values sequentially appearing in the plural vertical projection values; and a horizontal period calculation step for calculating the number of repeated horizontal periods including at least one or more minimum local horizontal projection values sequentially appearing in the plural horizontal projection values.

24. The pattern analysis-based motion vector compensation method as claimed in claim 23, wherein the vertical and horizontal period calculation steps calculate the numbers of repeated vertical and horizontal periods based on Equation as below:

$$\gamma_v = \frac{L_{v,a}}{2L_{v,p}}, \gamma_h = \frac{L_{h,a}}{2L_{h,p}},$$

wherein, $\gamma_v$ denotes the number of repeated vertical periods, $L_{v,a}$ denotes a vertical projection length obtained from adding all absolute differences between two neighboring vertical projection values of the plural vertical projection values, $L_{v,p}$ denotes an absolute difference between the maximum and minimum vertical projection values of the plural vertical projection values, $\gamma_h$ denotes the number of repeated horizontal periods, $L_{h,a}$ denotes a horizontal projection length obtained from adding all absolute differences between two neighboring horizontal projection values of the plural horizontal projection values, and $L_{h,p}$ denotes an absolute difference between the maximum and minimum horizontal projection values of the plural horizontal projection values.

25. The pattern analysis-based motion vector compensation method as claimed in claim 23, wherein the vertical period calculation step divides a horizontal length of the search area by the number of repeated vertical periods and calculates a vertical period of the pattern image, and the horizontal period calculation step divides a vertical length of the search area by the number of repeated horizontal periods and calculate a horizontal period of the pattern image.

26. The pattern analysis-based motion vector compensation method as claimed in claim 20, wherein the pattern decision step decides that the current block is a pattern image, if the number of the minimum local projection values is at least two and the number of repeated periods is larger than a predetermined first threshold value.

27. The pattern analysis-based motion vector compensation method as claimed in claim 20, further comprising a pattern classification step for classifying the pattern image into a static pattern image having zero motion of the current block or into a dynamic pattern image occurring due to motion of the current block, depending on a point of a minimum local error value that is nearest at distance to the center of the search area if the current block is the pattern image.

28. The pattern analysis-based motion vector compensation method as claimed in claim 27, wherein the pattern classification step compares a first minimum local error value located nearest at distance to the center of the search area with the period calculated by the period calculation step, and classifies the pattern image, the first minimum local error value being one of at least one minimum local error values between two points corresponding to predetermined first and second error values but smaller than the first and second error values of the plural motion estimation error values.

29. The pattern analysis-based motion vector compensation method as claimed in claim 28, wherein the pattern classification step decides that the pattern image is the static pattern image, if the pattern image satisfies a condition as below:

$$|u|=\alpha \cdot p$$

wherein, u denotes a point of the first minimum local error value that is nearest at distance, $\alpha$ denotes a certain constant, and p denotes a period calculated by the period calculation part.

30. The pattern analysis-based motion vector compensation method as claimed in claim 28, wherein the motion compensation step includes:

a static motion compensation step for estimating and producing the compensation motion vector based on a point corresponding to the first minimum local error value, if the pattern image is classified into the static pattern image;

an average vector calculation step for calculating an average vector of motion vectors of blocks neighboring to the current block, if the pattern image is classified into the dynamic pattern image; and a dynamic motion compensation step for estimating and producing the compensation motion vector based on a point of a second minimum local error value of at least one or more minimum local error values that is located nearest at distance to the calculated average vector.

31. The pattern analysis-based motion vector compensation method as claimed in claim 30, wherein, if the pattern classification step classifies the pattern image into the static pattern image, the motion vector selection step selects a compensation motion vector estimated by the static motion compensation step, and, if the pattern classification step classifies the pattern image into the dynamic pattern image, the motion vector selection step selects a compensation motion vector estimated by the dynamic motion compensation step.

32. The pattern analysis-based motion vector compensation method as claimed in claim 18, wherein, if the pattern decision step decides that the current block is the pattern image, the motion vector selection step selects as the final motion vector the compensation motion vector estimated by the motion compensation step.

33. The pattern analysis-based motion vector compensation method as claimed in claim 18, wherein the plural motion estimation error values are calculated by use of Sum of Absolute Difference (SAD), Mean Absolute Difference (MAD), or Mean Square Error (MSE).

34. The pattern analysis-based motion vector compensation method as claimed in claim 18, wherein the motion compensation step for producing the compensation motion vector is separate from and independent of the motion estimation step for estimating the temporary motion vector.

35. A pattern analysis-based motion vector compensation apparatus, comprising:

a motion estimation part for comparing a current block of a current frame/field to a certain search area established in a previous frame/field, calculating plural motion estimation error values, and estimating a temporary motion vector of the current block based on the plural motion estimation error values;

a pattern decision part for analyzing the calculated motion estimation error values, applying an integral projection to the motion estimation error values to produce plural integral vectors; verifying information of points of the plural integral vectors produced, and deciding whether the current block is a pattern image based on the verified information;

a motion compensation part for producing a compensation motion vector of the current block by use of the information of the points of the plural integral vectors if the current block is decided as the pattern image; and a motion vector selection part for selecting as a final motion vector either the temporary motion vector estimated by the motion estimation part or the compensation motion vector compensated for by the motion compensation part based on a result of the pattern decision part.

36. The pattern analysis-based motion vector compensation apparatus as claimed in claim 35, wherein the pattern decision part includes:

an integral projection unit for applying an integral projection to the plural motion estimation error values, and producing plural projection values;

a projection value verification unit for verifying the number of at least one or more minimum local projection values having motion estimation error values smaller than motion estimation error values corresponding to predetermined first and second projection values of the plural projection values;

a period calculation unit for calculating the number of repeated periods including at least one minimum local projection value sequentially appearing in the plural projection values, and dividing a length of the search area by the number of repeated periods to calculate a period; and a pattern decision unit for analyzing the verified number of minimum local projection values and the calculated number of repeated periods, and deciding whether the current block is the pattern image.

37. The pattern analysis-based motion vector compensation apparatus as claimed in claim 36, further comprising a pattern classification part for classifying the pattern image into a static pattern image having zero motion of the current block or into a dynamic pattern image occurring due to motion of the current block, based on a point of a minimum local error value that is nearest at distance to the center of the search area if the current block is the pattern image.

38. The pattern analysis-based motion vector compensation apparatus as claimed in claim 35, wherein, if the pattern decision part decides that the current block is the pattern image, the motion vector selection part selects as the final motion vector the compensation motion vector estimated by the motion compensation part.

39. The pattern analysis-based motion vector compensation apparatus as claimed in claim 35, wherein the motion compensation part calculates the compensated motion vector separately from and independently of the calculation of the temporary motion vector estimated by the motion estimation part.

* * * * *